(12) United States Patent
Yatskov (10) Patent No.: US 6,513,403 B2
(45) Date of Patent: Feb. 4, 2003

(54) FLEXIBLE DRIVE ROD FOR ACCESS TO ENCLOSED LOCATIONS

(75) Inventor: Alexander I. Yatskov, Kenmore, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/825,622

(22) Filed: Apr. 3, 2001

(65) Prior Publication Data

US 2002/0139208 A1 Oct. 3, 2002

(51) Int. Cl.⁷ .............................................. F16H 25/20
(52) U.S. Cl. ..................... 74/424.77; 411/392; 464/52
(58) Field of Search ................... 74/424.77; 15/104.33; 411/392; 464/52, 57; 343/903

(56) References Cited

U.S. PATENT DOCUMENTS

| | | | | |
|---|---|---|---|---|
| 2,240,087 A | * | 4/1941 | Barrett | 15/104.33 |
| 2,466,493 A | * | 4/1949 | Sletchley | 15/104.33 |
| 3,214,158 A | * | 10/1965 | Reiner | 49/324 |
| 4,570,893 A | * | 2/1986 | Ballantyne | 248/487 |

* cited by examiner

Primary Examiner—David Fenstermacher
(74) Attorney, Agent, or Firm—Seed IP Law Group PLLC (57) ABSTRACT

A flexible metallic bolt assembly including a flexible threaded rod formed of a helical tension coil spring is engaged by a rotationally fixed threaded hole, such as a nut, that defines a first longitudinal axis of the assembly. A guide positionally fixed relative to the threaded nut also engages the threaded rod. The guide defines a second longitudinal axis different from the first longitudinal axis. A rotary drive interface is provided, preferably at one end of the threaded rod.

29 Claims, 5 Drawing Sheets

FLEXIBLE DRIVE ROD FOR ACCESS TO ENCLOSED LOCATIONS

CROSS-REFERENCE TO RELATED APPLICATIONS

This application is related to application Ser. No. 09/825,747, filed on the same date herewith, and to application Ser. No. 09/825,630, filed on the same date herewith, now pending, which applications are incorporated herein by reference in their entirety.

TECHNICAL FIELD

The present invention relates to threaded rod assemblies, and in particular to threaded rod assemblies having flexible threaded rods.

BACKGROUND OF THE INVENTION

Many mechanical assembly applications require connections or adjustments in relatively inaccessible locations. Until now, such connections and adjustments have required either partial or complete disassembly of the equipment, or relatively complex designs including access panels or access holes. These designs increase the cost of the equipment and generally result in difficult or at least inconvenient assembly or adjustment procedures. These problems arise from the inherent nature of threaded fasteners or rods that advance and retract only in straight lines along a longitudinal axis. Many such assemblies and adjustments would be greatly simplified if these threaded fasteners could turn corners. However, conventional metal threaded fasteners and bolts are so inherently rigid as to prohibit the twisting and turning required to change directions.

SUMMARY OF THE INVENTION

The present invention provides a threaded element with sufficient flexibility to make substantial bends, while retaining sufficient strength and rigidity to function in applications requiring rigid connections and fine, accurate and repeatable adjustments.

According to principles of the present invention, a flexible metallic bolt assembly is provided. The assembly includes a flexible threaded rod formed of a helical coil tension spring and having a rotary drive interface. The rotary drive interface may be a knob, an Allen wrench socket, a standard Phillips or flat blade screw driver socket, or another suitable drive interface. A rotationally fixed nut having a threaded aperture, such as a standard or special round or hex nut, engages the threaded rod and defines a first longitudinal axis of the assembly. A guide extends around the threaded rod. The guide is spaced away from the threaded nut and provides a second longitudinal axis different from the first longitudinal axis.

According to one aspect of the invention, one or more additional guides are provided along the length of the threaded rod to constrain it substantially within its relaxed or unloaded configuration. Alternatively, one or more of the additional guides are threaded nuts positionally fixed relative to the first threaded nut, thereby providing an additional threaded interface which increases the load transference ability of the threaded rod.

According to various aspects of the invention, the additional guides and extra threaded nuts define the trajectory of the threaded rod by constraining its progress to a predetermined path determined by the relative orientation between successive guides and threaded nuts situated along a path. The possible trajectories of the path are not limited by changes in direction or length. The threaded rod is configured to follow a 3-dimensional snake-like trajectory, with the additional guides and extra threaded nuts providing extra column strength by reducing the unsupported column length between guides and threaded nuts.

According to one aspect of the invention, the coil spring forming the threaded rod is a torsional spring having each coil compressively contacting an adjacent coil and wound in a direction such that rotation of the threaded rod that advances the threaded rod relative to the threaded hole tends to increasingly compress adjacent coils relative to one another. The increasing compression between adjacent coils stabilizes the thread pitch and reduces the friction, resulting in smoother motion of the threaded rod through the successive guides and threaded holes. For example, clockwise rotation is used with a right-hand thread to transmit the load, while counterclockwise rotation is used with the right-hand thread to return the coil spring to its initial position.

According to other aspects of the invention, a method is provided for advancing a longitudinally rigid threaded rod along a 3-dimensional curving course. The threaded rod is formed of a helical coil tension spring with an initial compressive force between adjacent coils. This initial compressive force between adjacent coils provides the force necessary to avoid unwinding of the spring coils otherwise resulting from frictional forces during counterclockwise rotation. The relatively incompressible adjacent coils provide relative rigidity along the spring's longitudinal axis as defined by the individual longitudinal axes defined by adjacent coils. In other words, while the threaded rod is relatively incompressible along its length, the individual segments of the longitudinal axes defined by adjacent segments of the coils can be offset relative to one another to permit the threaded rod to follow a curving course. The spring is stiff in the direction of its axis, but flexible in other dimensions. The method of the invention therefore provides spatially fixing a threaded nut that defines a first longitudinal axis; orienting a rod guide that defines a second longitudinal axis that is different from the first longitudinal axis; and threading the coiled wire through each of the threaded hole and the guide. Optionally, additional guides and/or threaded holes are provided along the length of the intended curving course. A handle or other rotary interface is provided for rotating the threaded rod, which drives it through the threaded holes and along the rod guides. Thus, the threaded rod of the invention is optionally directed along a 3-dimensional trajectory without noticeable power losses.

DETAILED DESCRIPTION OF THE INVENTION

Figures 1A, 1B, 1C, 1D:
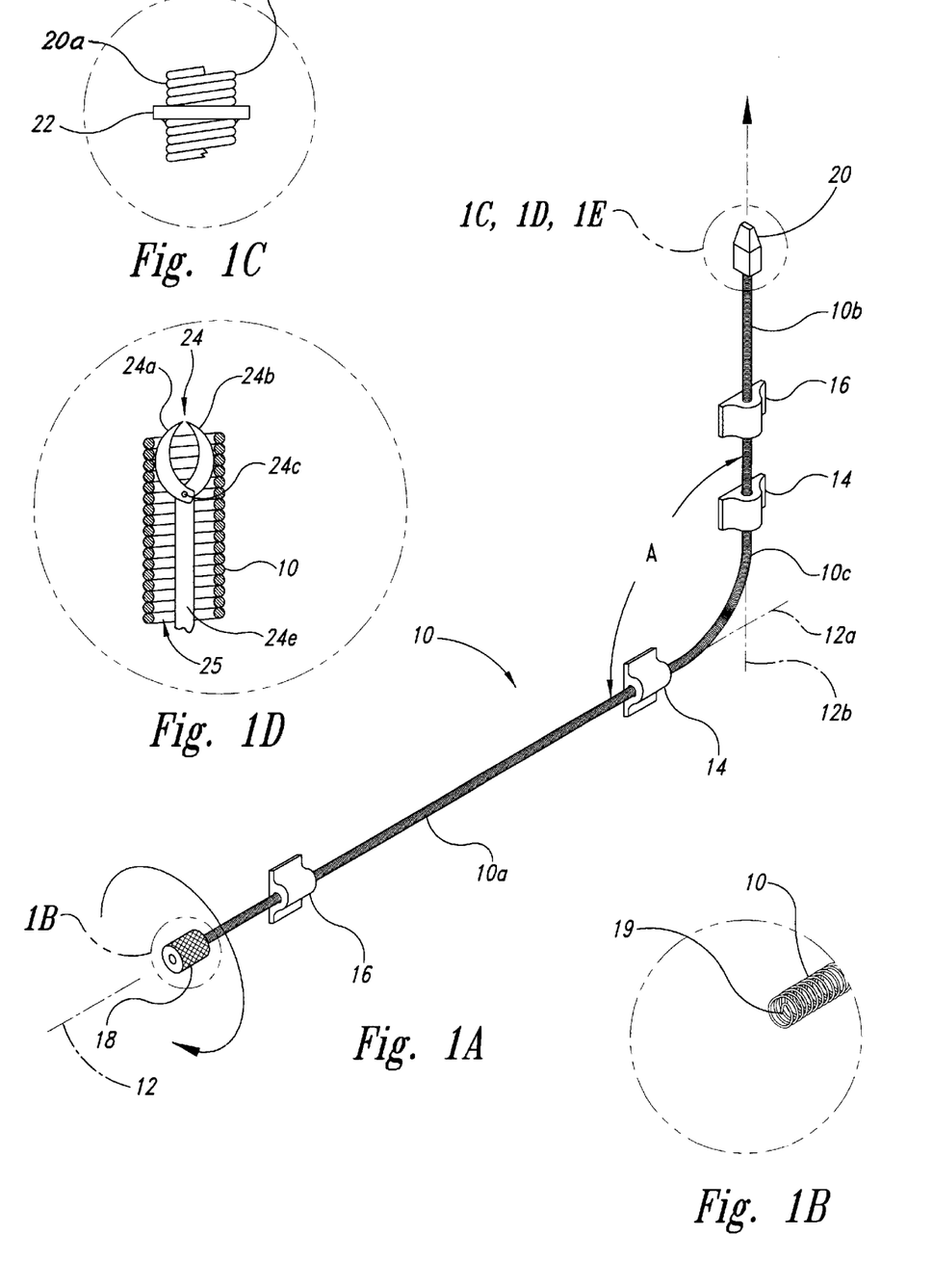
FIG. 1A is an illustrative assembly view of the flexible drive rod of the present invention.
FIG. 1B illustrates one alternative rotary drive interface for use with the flexible drive rod of the invention.
FIG. 1C illustrates an alternative termination structure for use with the flexible drive rod of the invention.
FIGS. 1D and 1E together illustrate an alternative termination structure for use with the flexible drive rod of the invention.

FIG. 1A illustrates the flexible drive rod of the invention. In FIG. 1A, a threaded rod 10 is formed of tightly coiled wire in the form of a helical coil spring. The coils of the wire spring define a diameter and pitch of the thread. As is generally known, such a tightly coiled helical spring generally forms a tubular structure having a longitudinal axis 12. See FIGS. 1A and 3. The coiled spring structure of threaded rod 10 is inherently flexible or bendable as a function of such factors as: the stiffness of the wire, the diameter of the wire, and the diameters of the individual coils. In FIG. 1A, threaded rod 10 is shown with a bend at a point along its length, illustrated as angle A. When such a bend angle A is introduced into the length of threaded rod 10, the otherwise substantially straight tubular structure is interrupted, and the threaded rod 10 is divided into first and second straight tubular sections 10a and 10b, respectively, interconnected by the curved tubular section 10c included by angle A. First straight tubular section 10a defines a first longitudinal axis 12a. Second straight tubular section 10b defines a second longitudinal axis 12b corresponding thereto. In the general case, the locations of longitudinal axes 12a and 12b are independent of each other. For example, portion 10c of threaded rod 10 between first and second substantially straight tubular portions 10a and 10b may be formed in a complex, multidimensional curve. Thus, while the invention is described in relationship to FIG. 1 as a simple bend such that longitudinal axes 12a and 12b are oriented at angle A, the invention is not limited to the specific case. The invention also covers the cases, which are described in more detail below, wherein threaded rod 10 is curved in one or more dimensions and longitudinal axes 12a and 12b are relatively angularly oriented in any dimension and fail to intersect one another at any point.

Threaded nuts 14 are formed with a diameter and a pitch substantially matched to threaded rod 10, such that rotation of threaded rod 10 within a relatively rotationally and positionally stationary threaded nut 14 causes threaded rod 10 to threadedly advance through threaded nut 14 along their coincident longitudinal axes. Threaded nut is used herein in its broadest sense and includes such equivalent structures as, for example, plates or sheets of material with threaded apertures formed therein; internally threaded tubes or pipes; square and hex nuts and other suitable internally threaded structures. The threads formed by a coiled wire are substantially regular in diameter and pitch throughout the substantially straight tubular sections of threaded rod 10 between various bends and twists therein. Thus, the coils present a straight threaded structure having a diameter and thread pitch substantially matched to each of threaded nuts 14, whereby threaded rod 10 is advanced relative to stationary threaded nut 14 when rotated in a first direction. Preferably, within the parameters of the invention, the coil pitch P and outer diameter D of threaded rod 10 (shown in FIG. 5) are chosen to substantially match a standard diameter and thread pitch, such as those defined in the Unified Thread Standard and the American Standard screw threads for bolts, nuts, and machine screws; and the international (metric) standard screw thread; or another thread standard for which threaded fasteners, i.e., nuts, are commercially available. Alternatively, pitch P and diameter D are specifically defined for a particular application.

According to one embodiment of the invention, one or more guide ways 16 are provided at various locations along the length of threaded rod 10a, 10b. Each guide way 16 is positionally fixed relative to threaded nut 14. As is generally known, columnar strength decreases with an increase in unsupported length. Stated differently, the tendency toward columnar buckling increases with increased unsupported length. Threaded rod 10 is not a true column, being formed of a helical coil spring. Thus, the tendency toward columnar buckling of threaded rod 10 may be greater for a given unsupported length than for a tube of the same overall dimensions. Guide ways 16 therefore provide columnar support for flexible threaded rod 10 at various points along its length. The distances between successive guide ways 16 is thus determined, in part, by the tendency of threaded rod 10 to buckle under the load applied at an operative, load-bearing point along its length, such as termination 20. Guide ways 16 have an additional function discussed in more detail below. A rotary drive interface 18 is fixed relative to one end of threaded rod 10 for applying a rotational force. Rotary drive interface 18 is preferably provided in a substantially accessible position relative to other equipment in any specific application. Rotary drive interface 18 may be, for example, any of a hand operable twisting mechanism, such as a knurled knob, a key or wing-shaped knob, or another suitable handle rotationally fixedly to a drive end of threaded rod 10. Alternatively, threaded rod 10 is fitted with a screw driver slot, such as a standard Phillips screwdriver slot or a straight slot for a flat bladed screwdriver, or one of several specialty drives such as a star or hex drive, or another suitable rotary drive interface 18 configuration.

FIG. 1B illustrates yet another alternative embodiment of the invention, wherein a final coil of threaded rod 10 is formed with an exaggerated bend such that a portion of the wire forming threaded rod 10 forms a tang 19 in the tubular opening of threaded rod 10 to provide the rotary drive interface 18. Other alternatives for grasping and turning threaded rod 10 are numerous and generally known; such alternatives are equivalent to those described herein.

A termination 20 is optionally provided on threaded rod 10. The function of threaded rod 10 in a specific application determines the form of termination 20. For example, the flexible drive rod of the invention is terminated in a specific attachment for remote installation. FIG. 1C illustrates an application requiring a mechanical connection, wherein termination 20 is simply the cut end of threaded rod 10 as shown at 20a. In an application requiring threaded rod 10 to apply a clamping force, a collar 22, such as a small washer, is axially fixed to threaded rod 10 in a position such that an appropriate threaded length of threaded rod 10 is exposed beyond collar 22. Termination 20 is alternatively a standard flat bladed screwdriver blade or slot; a Phillips screw driver blade or slot; or any other acceptable interface for engaging an item at the end of the rod at the remote location.

Figures 1E, 2, 3:
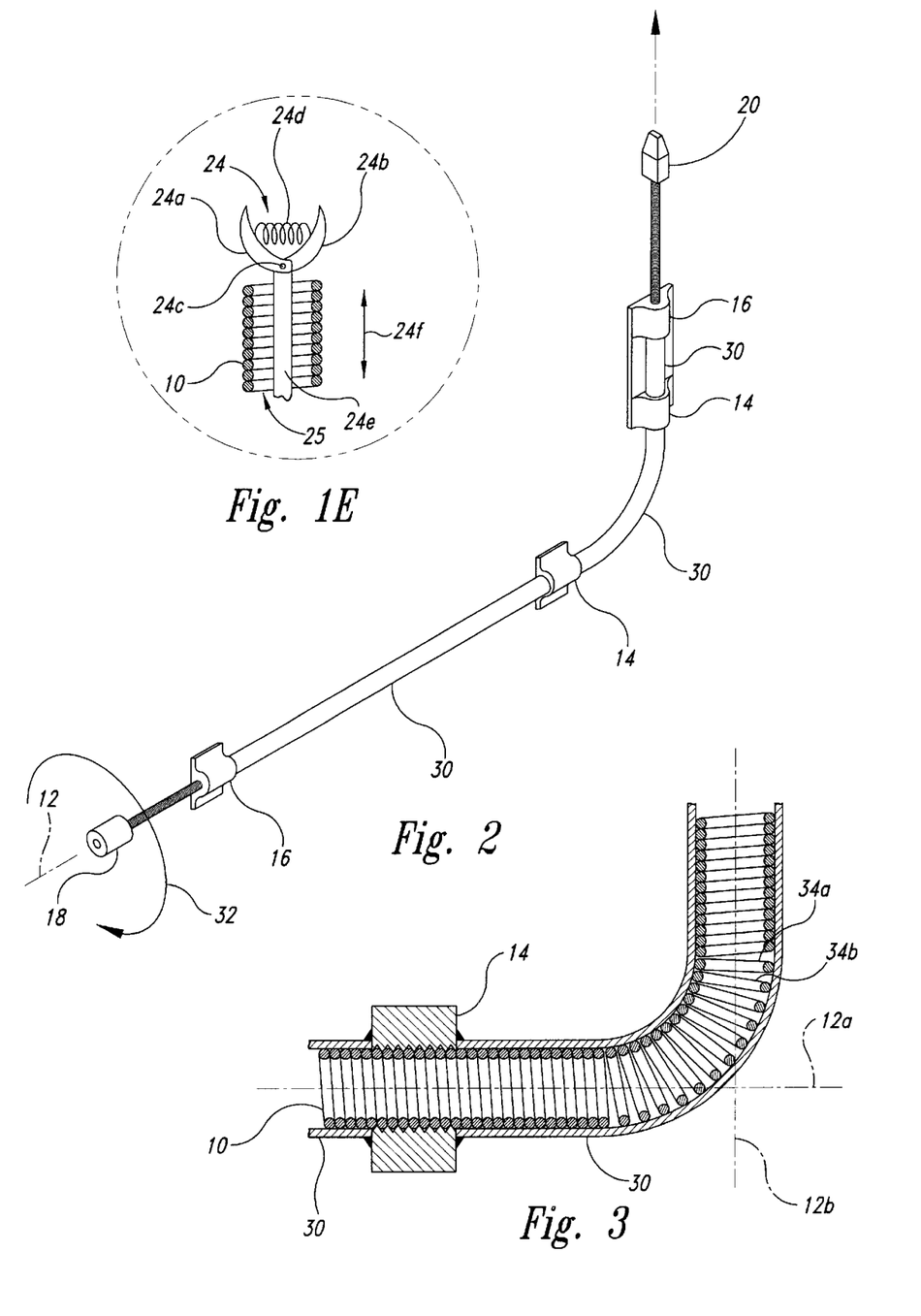
FIG. 2 is an illustration of an alternative embodiment of the flexible drive rod of the present invention.
FIG. 3 illustrates the operation of the flexible drive rod of the present invention.

FIGS. 1D and 1E together illustrate another alternative embodiment of termination 20, wherein a clamp 24 is provided. Clamp 24 is operable between a first closed configuration, as shown in FIG. 1D, and a second open configuration, as shown in FIG. 1E, according to mechanical means well-known in the art. For example, a pair of interconnected jaws 24a and 24b are provided wherein each is rotatable about a hinge 24c. Clamp 24 is, as shown in FIG. 1D for example, sized to pass in its first closed configuration through the substantially tubular interior 25 of threaded rod 10, thereby traveling along part of all of the length thereof. Threaded rod 10 is driven to have its operating end at termination 20 in a desired position relative to a work piece (not shown). Clamp 24 is passed to the operating end of threaded rod 10 by means of a smooth rod 24e coupled to clamp 24, for example, at hinge 24c, and long enough to still project from the drive end of threaded rod 10 at rotary drive interface 18. Clamp 24 is, for example, configured such that its normal configuration is its second open configuration. For example, as shown in FIG. 1E, a spring member 24d normally forces the tips of jaws 24a and 24b to rotate away from one another about hinge 24c. Thus, as clamp 24 emerges from the tubular interior of threaded rod 10, jaws 24a and 24b spread apart automatically into the second open configuration. Jaws 24a and 24b are thus configured to converge on an object (not shown) and capture the object. As smooth rod 24e is retracted, the tips of jaws 24a and 24b are also pulled back into the tubular interior of threaded rod 10. The outer surfaces of jaws 24a and 24b contact the restriction at termination 20 and are squeezed back together against the force of spring member 24d, thereby capturing the desired object between jaws 24a and 24b. The precise location of clamp 24 when jaws 24a and 24b are closed is adjusted by threadedly moving threaded rod 10 along its predetermined trajectory, as indicated by an arrow 24f.

The flexible drive rod of the invention thus provides mechanical connections, adjustments, and attachment insertions in relatively inaccessible or enclosed locations. Furthermore, the rigid nature of metallic threaded rod 10 also presents substantial axial force and/or substantial precision in combination with threaded nuts 14.

FIG. 2 illustrates the flexible drive rod of the invention, wherein one or more tubular guides 30 are either substituted for guide ways 16, shown in FIG. 1, or are inserted between adjacent guide ways 16 and threaded nuts 14, as shown. Tubular guides 30 preferably provide columnar support along substantially the entire length of threaded rod 10, thereby overcoming any tendency toward columnar buckling. Preferably, tubular guides 30 are positionally fixed relative to threaded nuts 14.

FIG. 3 is a sectional view through the assembly showing one of threaded nuts 14 between portions of tubular guides 30. FIG. 3 also illustrates one method of interconnecting tubular guides 30 with threaded nuts 14 such that tubular guides 30 are positionally fixed relative to at least one of threaded nuts 14. Threaded rod 10 is illustrated within the confines of tubular guide 30 such that threaded rod 10 is supported thereby. Operationally, when a turning torque represented by arrow 32 is applied to threaded rod 10, resistance to turning causes an increase of torque in threaded rod 10 that tends to twist threaded rod 10 out of plane, a phenomenon also known as "helical buckling." In particular, a torque applied to threaded rod 10 tends to twist individual coils 34a and 34b out of alignment with each of longitudinal axes 12a and 12b. Thus, applied torque 32 tends to twist the nominally straight but unsupported portions of threaded rod 10 out of alignment with respective longitudinal axes 12a or 12b. This tendency toward helical buckling is most pronounced at bending or turning points in an unsupported length of threaded rod 10. For example, the applied torque tends to twist individual coils 34a and 34b out of the plane defined by intersecting longitudinal axes 12a and 12b at bend angle A. Tubular guide 30 therefore tends to constrain threaded rod 10 to the physical orientation and alignment it has when in a relaxed state, i.e., with no torque 32 applied. The tendency of threaded rod 10 to buckle or twist under load is optionally resisted to a greater or lesser degree depending upon the clearance between the internal walls of tubular guide 30 and/or guide ways 16 and the outer diameter of threaded rod 10 in its relaxed state. Some of the factors determining the choice of clearance between threaded rod 10 and either of tubular guides 30 and guide ways 16 include the desired precision in the motion of threaded rod 10 along its longitudinal axes as a torque is applied, and the relative resistance to an applied torque resulting from frictional interference between the outer diameter of threaded rod 10 and the internal walls of tubular guide 30. A closer fit between threaded rod 10 and tubular guide 30 increases the accuracy or precision in the advancement of threaded rod 10 along its longitudinal axis 12, while a relatively looser fit requires a lesser torque 32 to advance threaded rod 10.

Figure 4:
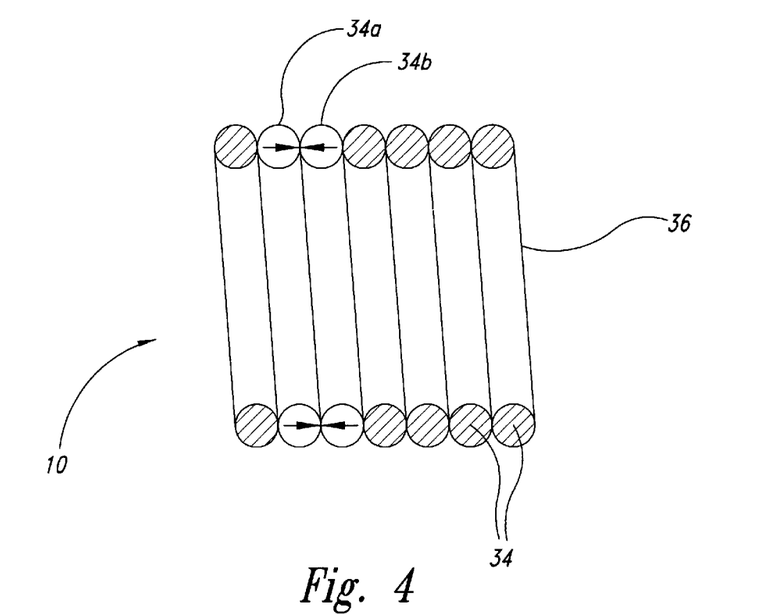
FIG. 4 illustrates one embodiment of the threads of the flexible drive rod of the present invention.

FIG. 4 illustrates the preferred configuration for coils 34 formed in a wire 36 forming threaded rod 10. Threaded rod 10 is preferably formed as a helical coil tension spring with an initial tension sufficient to provide substantially compressive contact between adjacent coils 34a and 34b. Threaded rod 10 is thus formed of multiple coils 34a in compressive contact with adjacent coils 34b. Since wire 36 is preformed with a compression force between coils 34a, 34b, coils 34 form a rigid interface for the threads in the nut, similar to that of a solid metal bolt. The shape of the interface between adjacent coils 34a and 34b in compressive contact is similar to that of a standard bolt. Thus, coils 34 can be used to interface with a standard sized, commercially available nut.

Wire 36 forming threaded rod 10 is preferably one of several generally accepted spring materials, such as clock spring steel, stainless steel wire, high carbon wire, oil-tempered wire, music wire, hard drawn spring wire, plastic cable, or another suitable material such as one of the materials listed in *Marks' Standard Handbook for Mechanical Engineers*, 8$^{th}$ Edition, printed by McGraw Hill Book Company of New York, N.Y., at Table 84, chapter 8, at pages 8–78 through 8–80, which is a reprint from the *Handbook of Mechanical Spring Design* by the Associated Spring Corporation, and is incorporated herein by reference. The choice of spring material is subject to the specific design requirements of a particular application.

Figure 5:
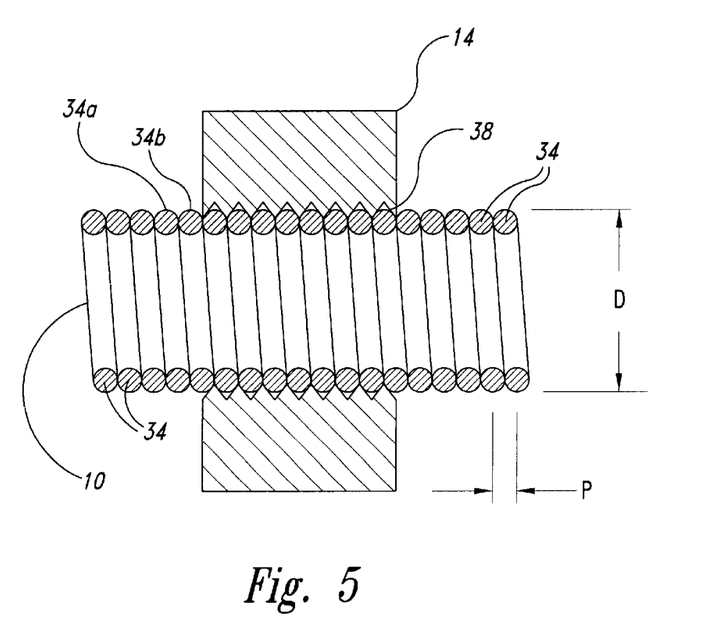
FIG. 5 illustrates the mechanical interaction between the flexible threaded rod and the threaded fastener of the invention.

FIG. 5 is an enlarged section view of threaded rod 10 within one of threaded nuts 14. As is illustrated in FIG. 5, the diameter and pitch of coils 34 are substantially matched to the diameter and pitch of internal threads 38 formed in threaded nut 14, such that a torque applied to threaded rod 10 in either direction, advancing or retracting relative to threads 38, causes the individual coils 34 to smoothly track in threads 38. In one embodiment, threaded rod 10 is configured with an outer diameter D such that the threads of threaded rod 10 formed by the individual coils 34 leave a slight clearance with threads 38 of threaded nut 14. In other words, threaded rod 10 fits slightly loosely within threaded nut 14. Furthermore, coils 34 are formed with a pitch P slightly coarser than the pitch of threads 38. Given this preferred embodiment, threaded rod 10 tends to advance or retract relative to threaded nut 14 in response to a relatively light torque 32 applied while threaded rod 10 is in a substantially relaxed state, i.e., no significant rotational resistance is present. On the other hand, when a rotational resistance is applied, for example at termination 20, shown in FIG. 1, a substantial torque 32 applied at rotary drive 18 causes adjacent coils 34a, 34b of rod 10 to shift slightly along longitudinal axis 12, thereby tightening the pitch P of coils 34a, 34b, while slightly increasing overall diameter D of threaded rod 10. In such a loaded condition, individual coils 34a and 34b shift into more precise mating with corresponding individual threads 38, thereby increasing the mechanical interface between the threads of threaded rod 10 and the threads of threaded nut 14, i.e., the interface between coils 34a, 34b and threads 38. The increased engagement between coils 34 and threads 38 increases torque transference and advances threaded rod 10 relative to nut 14 with an increased axial force.

Figure 6:
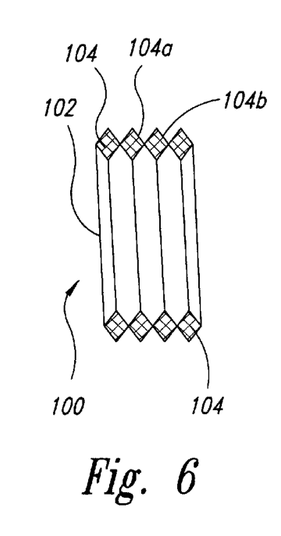
FIG. 6 illustrates an alternative embodiment of the threads of the present invention.

FIG. 6 illustrates one of various alternative embodiments of the flexible drive rod of the invention. Earlier disclosed threaded rod 10, shown in FIGS. 1 through 5, illustrated the use of round wire 36 in the formation of threaded rod 10. However, other wire configurations are alternatively employed. Threaded rod 100, for example, is formed of a wire 102 having a polygonal cross-section, such as a triangular, hexagonal, rectangular or square cross-section. In particular, coils 104a and 104b formed of square wire 102 in a diamond orientation present more engagement surface to threads 38 of nut 14 than do coils 34 formed of round wire. The greater engagement surface area allows a greater torque 32 to be applied against a greater resistance at termination 20 because the increased engagement area between the threads improves torque transference. Alternatively, a longer threaded nut 14 presents more threads, which results in a greater engagement surface area and also permits transference of larger torques.

Other alternative embodiments include varying diameter D and pitch P of threaded rod 10 and matching threads 38 and nut 14 for greater or lesser axial force transmission, and/or increased or decreased linear adjustment capability. For example, in an application where flexible drive rod 10, 100 of the invention is intended to provide a secure mechanical connection at termination 20, a finer pitch P and a larger diameter D with a closer fit between coils 34, 104 and threads 38 generally provide increased threaded surface engagement thereby allowing threaded rod 10, 100 to more effectively translate applied torque 32 into axial force. Finer threads also translate applied torque 32 into linear motion at a lower rate, i.e., more threads per inch require more turns of rotary drive interface 18 to advance threaded rod 10 a given linear distance along longitudinal axis 12. On the other hand, a larger pitch P and smaller diameter D, i.e., a coarser thread, provide the advantage of fewer threads per inch thereby reducing the torque input required to advance threaded rod 10 relative to threaded nut 14, while also reducing the number of turns required for a given linear advancement. Generally, a coarser thread is formed of a larger diameter wire 36 such that the pitch P between adjacent coils 34a, 34b and 104a, 104b is increased.

Figure 7:
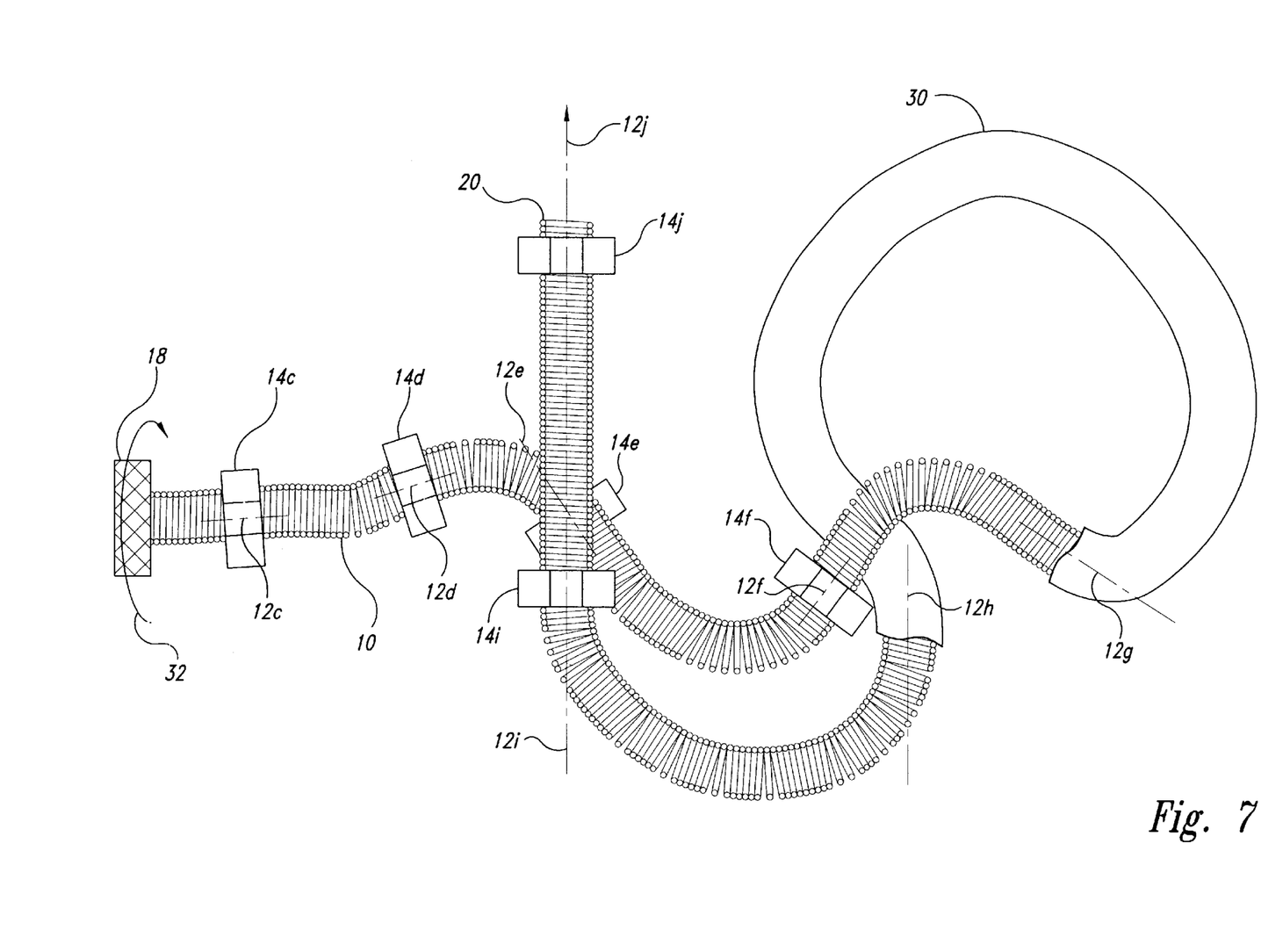
FIG. 7 illustrates alternative embodiments of the support structure of the present invention.

FIG. 7 illustrates the general cases wherein threaded rod 10 is curved in multiple dimensions and defines multiple longitudinal axes 12c through 12n (12c through 12j shown) that are relatively angularly oriented in any dimension do not necessarily intersect one another at any point. In FIG. 7, threaded rod 10 describes a convoluted, twisting and turning trajectory. The trajectory is guided by a multitude of threaded nuts 14c through 14n (14c through 14j shown) each associated with a respective instantaneous longitudinal axis 12c through 12j and angularly oriented relative to one another. A portion of tubular guide 30 is optionally utilized to guide threaded rod 10 through one complex, 3-dimensional curve. Thus, threaded rod 10 optionally curves in a complex, snake-like form that describes a series of convoluted 3-dimensional curves that even double-back and cross over one another. Clearly, a flexible rod 10 having fewer or more curves than shown in FIG. 7 could also be used. FIG. 7 represents what could be termed an example showing many possible alternative shapes, only some of which would be used in any one product. Threaded rod 10 of the invention exhibits sufficient flexibility to travel such a trajectory and still remain sufficiently rigid along its columnar axis at termination 20 to do useful work. Thus, a torque applied at knob 18 fixed at a first end of threaded rod 10 effectively drives threaded rod 10 relative to each threaded nut 14 and each tubular support 30 to generate a useful axial force F at termination 20.

Figure 8:
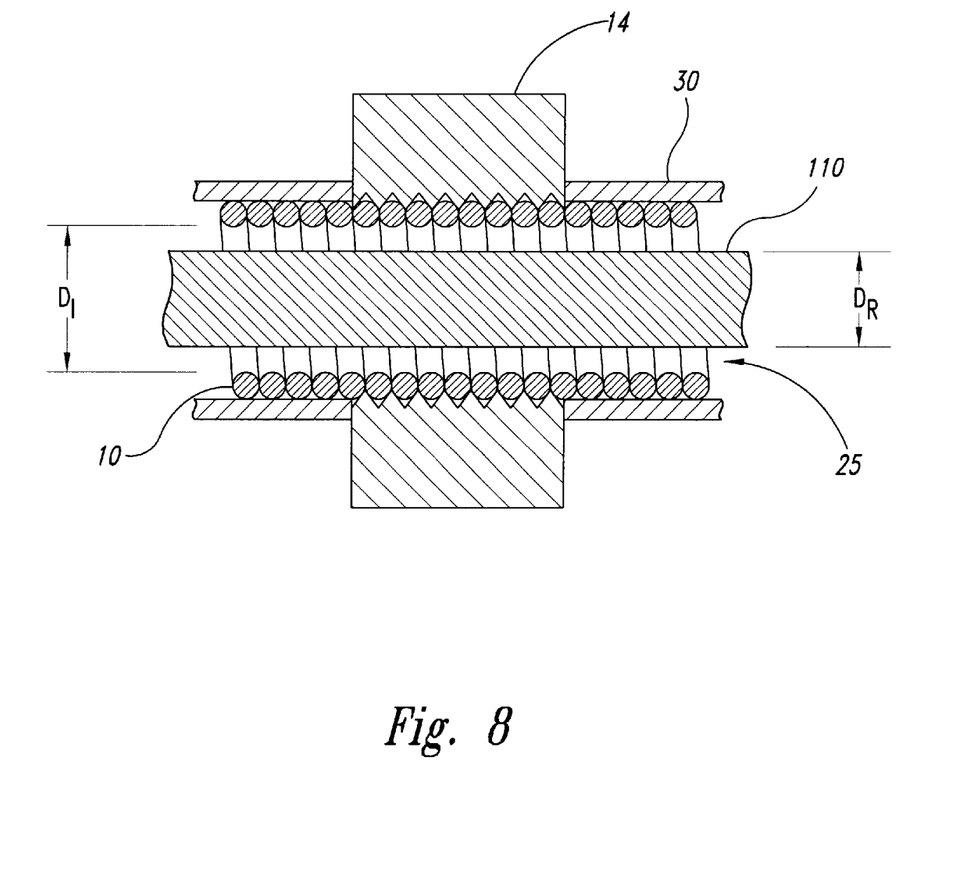
FIG. 8 illustrates an alternative embodiment of the flexible drive rod of the invention.

FIG. 8 illustrates yet another alternative embodiment of the flexible drive rod of the invention, wherein a substantially smooth rod guide 110 is disposed within the inner diameter $D_I$ of the interior of flexible threaded rod 10 and provides the mechanical support provided by tubular guides 30, shown also in FIGS. 2–3. Rod guide 110 preferably has a diameter $D_R$ smaller than diameter $D_I$ of threaded rod 10 such that a predetermined amount of clearance exists between rod guide 110 and the inside of threaded rod 10. In operation, the change in curvature of threaded rod 10 with a change in direction inherently causes inner diameter $D_I$ of threaded rod 10 to decrease slightly due to the angular shift of individual coils 34 relative to the instantaneous center line of diameter $D_I$. Therefore, having at least a minimal clearance between inner diameter $D_I$ of threaded rod 10 and outer diameter $D_R$ of rod guide 110 allows rod guide 110 to continue to fit within interior diameter $D_I$ of threaded rod 10 and prevents binding at directional changes. Rod guide 110 preferably extends the entire length of threaded rod 10 to resist the tendency to twist when a torque is applied to rotary drive interface 18. Furthermore, tubular supports 30 and internal rod guide/support 110 are optionally combined in the single application to maximize resistance against twisting of threaded rod 10 when a substantial torque 32 is applied at rotary drive interface 18 against a substantial turning resistance at termination 20.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A flexible bolt assembly comprising:
 a rotationally fixed threaded nut aligned along a first axis;
 a guide positionally fixed relative to said threaded nut and aligned along a second axis different from said first axis; and
 a flexible threaded rod engaged with said rotationally fixed threaded nut and aligned along said first axis and engaged with said guide and aligned along said second axis, the flexible threaded rod composed of a coiled wire having a plurality of coils wound in a direction such that rotation of said threaded rod to advance said threaded rod relative to said threaded nut tends to increasingly compress the coils.

2. The flexible bolt assembly of claim 1, wherein said coiled wire has coils that define a diameter and a pitch of said threaded rod.

3. The flexible bolt assembly of claim 1, wherein said coiled wire further comprises a torsional spring.

4. The flexible bolt assembly of claims 1, wherein the coils are preformed in a compressed relationship such that adjacent coils are compressed to contact each other when the rod is at rest.

5. The flexible bolt assembly of claim 1, further comprising one or more additional guides disposed along a length of said threaded rod.

6. The flexible bolt assembly of claim 5, wherein one of said additional guides further comprises a second rotationally fixed threaded nut.

7. The flexible bolt assembly of claim 1, wherein said flexible threaded rod further comprises a substantially tubular interior formed by said coils and defining a cavity in said threaded rod.

8. The flexible bolt assembly of claim 7, further comprising a smooth rod slideably positioned within the cavity in the threaded rod.

9. The flexible bolt assembly of claim 1, further comprising a rotary drive interface for imparting rotational force to the flexible threaded rod.

10. The flexible bolt assembly of claim 9, wherein said rotary drive interface comprises a knob rotationally fixed relative to said threaded rod.

11. The flexible bolt assembly of claim 1, wherein said guide further comprises a tubular guide having an internal wall disposed about said threaded rod.

12. The flexible bolt assembly of claim 1, wherein said coiled wire further comprises one of a wire having a substantially round cross-section, and a wire having a substantially polygonal cross-section.

13. A flexible bolt assembly comprising:
- a relatively stationary threaded member having a predetermined diameter and pitch and defining a first longitudinal axis;
- a coiled wire having a diameter and pitch sized to cooperate with said predetermined diameter and pitch of said stationary threaded member, said coiled wire formed with compressively contacting adjacent coils wound in a direction relative to said threaded member such that advancingly rotating said coil spring relative to said stationary threaded member against a resistance tends to increase said compressive contact; and
- a guide engaging said coiled wire, said guide positionally fixed relative to said threaded member and defining a second longitudinal axis different from said first longitudinal axis.

14. The flexible bolt assembly of claim 13, further comprising one or more additional guides disposed along the length of said coiled wire.

15. The flexible bolt assembly of claim 14, wherein one of said additional guides further comprises a second relatively stationary threaded member.

16. The flexible bolt assembly of claim 13, wherein said guide further comprises a tube disposed about said coiled wire.

17. The flexible bolt assembly of claim 13, wherein said guide further comprises a rod disposed within a cavity formed within said coils.

18. The flexible bolt assembly of claim 13, wherein said coiled wire further comprises an attachment fixed thereto.

19. The flexible bolt assembly of claim 13, wherein said coiled wire further comprises one of a wire having a substantially round cross-section, and a wire having a substantially rectangular cross-section.

20. The flexible bolt assembly of claim 13 further comprising a rotary drive interface fixed to one end of said coiled wire for receiving a drive torque to said coiled wire.

21. The flexible bolt assembly of claim 13, wherein said coiled wire further comprises a helical coil spring.

22. A method for curvingly advancing and retracting a threaded rod, the method comprising:
- spatially fixing a first threaded nut defining a first longitudinal axis;
- orienting a first guide defining a second longitudinal axis different from said first longitudinal axis;
- forming a coiled wire of a plurality of adjacent coils compressively contacting another adjacent coil, said coils forming threads compatible with said threaded nut; and
- threading said coiled wire through each of said first threaded nut and said first guide.

23. The method of claim 22, wherein said threading said coiled wire through each of said first threaded nut and said first guide further comprises:
- providing a handle fixed to said coiled wire; and
- applying a rotary drive force to said handle.

24. The method of claim 22, further comprising orienting one or more additional guides defining respective longitudinal axes coincident with one of said first and second longitudinal axes.

25. The method of claim 24, wherein one of said additional guides further comprises a second threaded nut; and further comprising spatially fixing said second threaded nut relative to said first threaded nut.

26. A method for curvingly advancing and retracting a threaded rod, the method comprising:
- threading a coiled wire through a first threaded nut spatially fixed along a first longitudinal axis, said coiled wire formed of a plurality of adjacent coils compressively contacting another adjacent coil and forming threads compatible with said threaded nut;
- curving a portion of said coiled wire into alignment with a second longitudinal axis; and
- passing a portion of said coiled wire into a first guide oriented along a second longitudinal axis different from said first longitudinal axis.

27. The method of claim 26, wherein said threading further comprises applying a torque at a rotary drive interface rotationally fixed relative to said coiled wire.

28. The method of claim 26, further comprising passing a portion of said coiled wire into one or more additional guides oriented along respective longitudinal axes coincident with one of said first and second longitudinal axes.

29. The method of claim 28, wherein one of said additional guides further comprises a second threaded nut spatially fixed relative to said first threaded nut.

* * * * *